Oct. 12, 1971  R. R. BLANDFORD  3,611,727
WAVE-FORMING STRUCTURE
Filed Feb. 26, 1970  2 Sheets-Sheet 1
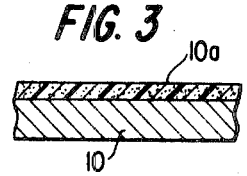
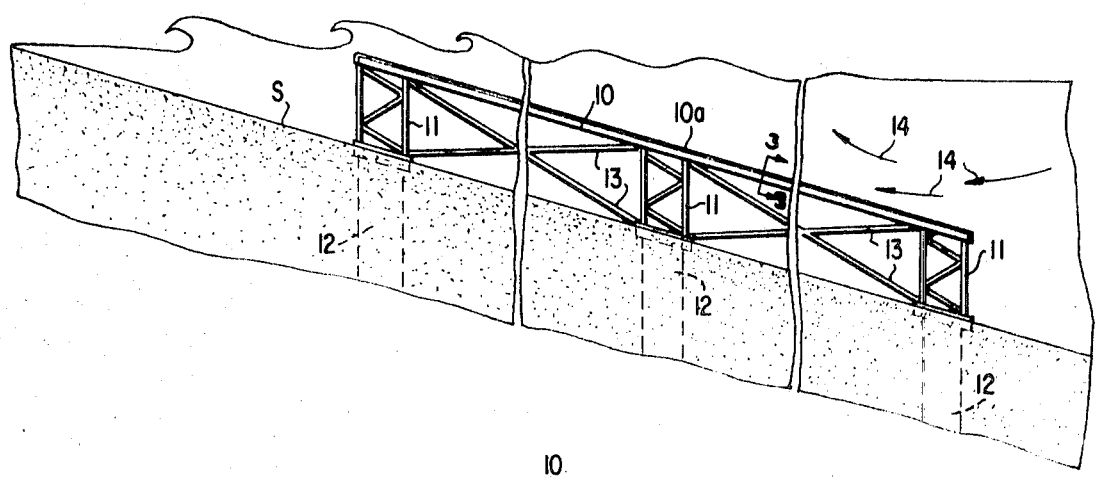
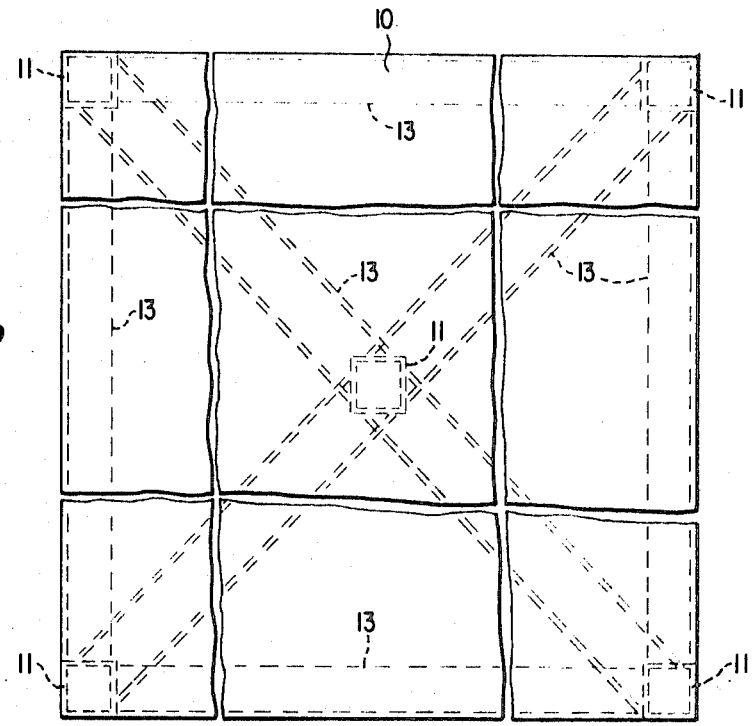
INVENTOR:
Robert R. Blandford
By Alexander Morell
Attorney

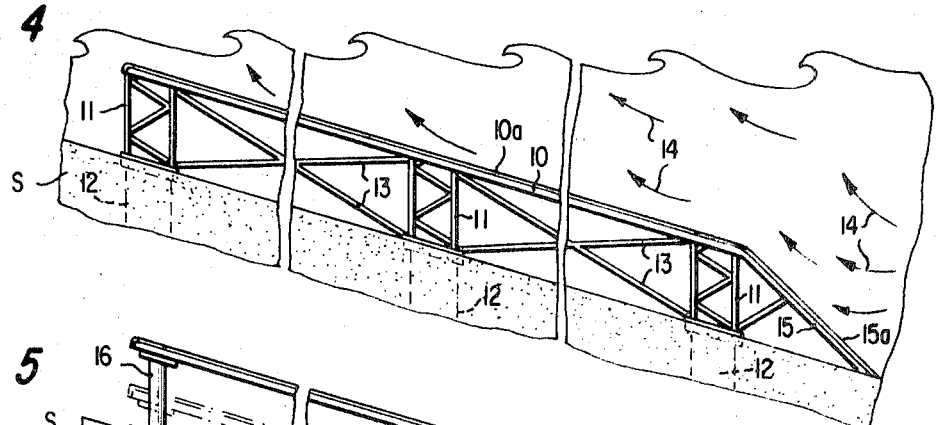
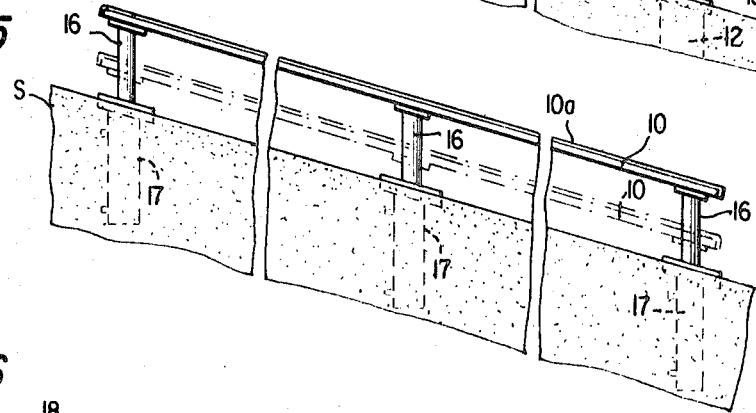
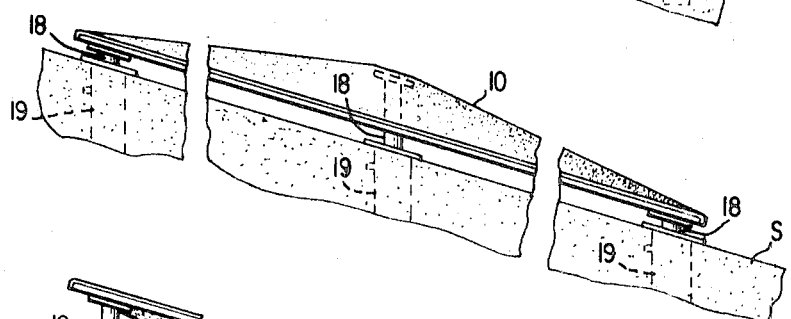
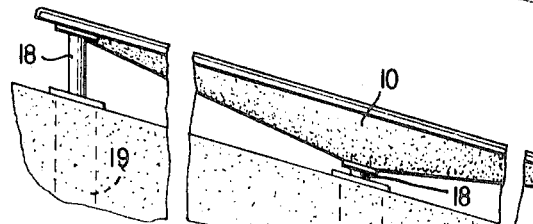
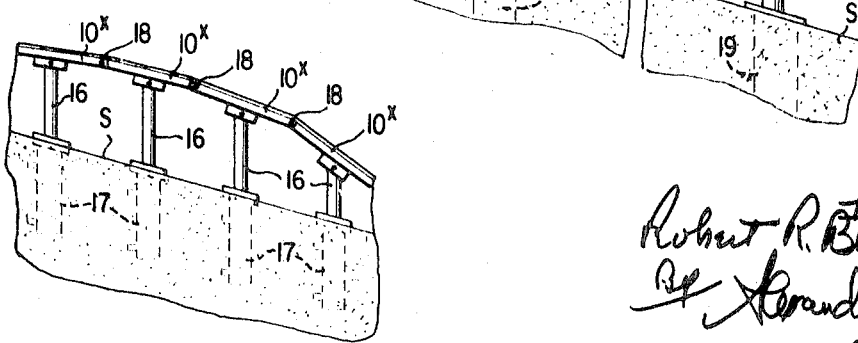

3,611,727
WAVE-FORMING STRUCTURE
Robert R. Blandford, 1809 Paul Spring Road,
Alexandria, Va. 22307
Filed Feb. 26, 1970, Ser. No. 14,291
Int. Cl. E02b 3/02
U.S. Cl. 61—1                           10 Claims

ABSTRACT OF THE DISCLOSURE

An artificial structure is provided offshore to provide an artificial sea-bottom surface of suitable shape to form waves thereon of a desired type from arriving deep-ocean waves for surfers and swimmers disposed on or above the artificial sea-bottom surface.

DESCRIPTION OF INVENTION

This invention is a novel wave-forming device. The basic idea of this invention is an artificial structure offshore to provide an artificial sea-bottom surface of suitable shape to form waves of a desired type from arriving deep-ocean waves. Waves, as they approach the shore, in some locations, assume shapes which are useful for recreation, usually by surfers or body-surfers. Good locations are rare in nature because the waves must come upon underwater topography of just the right slope and depth in order to form up and maintain themselves satisfactorily.

Classical wave theory and common observation shows that a wave will break when it reaches a certain steepness. If it is kept just on the verge of breaking it will form what is called a "spilling" wave, a type often sought by surfers. Bringing it just beyond this steepness is a prerequisite for creation of waves in which the surfer may "shoot the curl." In this mode the surfer travels almost parallel to the front of the wave, thus going farther than if he went straight ahead.

Waves increase in steepness and height in shallow water because the energy which in deep water was distributed throughout the deep water column, travels along with the wave, and in shallow water is in part transformed into potential energy of height. At the same time the wave length shortens because of the decrease of the wave speed in shallow water.

Classical linear theory (see e.g. Wind Waves by Blair Kinsman, Prentice Hall, 1965, pp. 158–160, 274) makes it possible to predict the steepness of a wave in any depth water from its steepness and wavelength in deep water.

Experiments with solitary waves, see, e.g. pages 70, 174, 175, Wiegel, Oceanographical Engineering, 1964, Prentice Hall, and C. J. Galvin, Jr., Journal of Geophysical Research, volume 73, No. 12, pp. 3651–3659 show that a different bottom slope is required to place each different wave just at the edge between spilling and breaking. If a wave happens upon a very steep beach it may either be reflected or may collapse. If the slope were smaller the wave would break, and if it were still smaller the wave would spill. Breaking or spilling will occur at a water depth roughly equal to the crest to trough height of the breaking or spilling wave; more exactly between the limits of 0.7 to 1.5 times the crest to trough height. This corresponds to the limits of 0.7 to 3.0 times the deepwater crest to trough height.

Once the wave has begun to spill, thus losing energy, a very slight slope will maintain it in a form suitable for surfing, and thus, for a great distance the depth should be closely equal to the breaking depth. Typical slopes for creation of the spilling wave would range between $\frac{1}{10}$ and $\frac{1}{100}$, while slopes in the region beyond breaking would be less than $\frac{1}{100}$.

While surfing is the principal use envisioned for the structure, it may also be of interest to create other types of waves perhaps more suitable for swimmers to have fun in, and hence, I do not limit my invention to structures intended for use by body-surfers only. Also, since the required platform depth changes with wave type and with phase of the tide, it is clear that the ability to raise and lower the structure would be highly advantageous.

I will explain the invention with reference to the accompanying drawings which illustrate several practical embodiments thereof, to enable others familiar with the art to adopt and use the same; and will summarize in the claims the novel features of construction and novel combinations of parts, for which protection is desired.

In said drawings:

FIG. 1 is an elevational view showing one modification of a wave-forming structure disposed offshore to provide an artificial seabottom surface to form waves thereon of the desired type from arriving deep-ocean waves.

FIG. 2 is a plan view of the structure shown in FIG. 1.

FIG. 3 is an enlarged section on the line 3—3, FIG. 1.

FIG. 4 is an elevational view of a modified structure having a ramp on the seaward side.

FIG. 5 is an elevational view of a modification in which the surface is raised or lowered hydraulically.

FIGS. 6 and 7 show further modifications of the structure.

FIG. 8 is a sectional view of a modification of the surface of the structure.

FIG. 9 is an elevational view of a further modification showing the rigid plates of the sections of the flexible surface connected by mechanical or flexible hinges.

The structure might be realized in many ways, one practical embodiment being a permanent artificial surface supported above the true sea-bottom by a set of girders set in permanent underwater foundations.

As shown in FIGS. 1 and 2, the artificial surface 10 is substantially rigid and supported by a plurality of girders 11 of any desired structural shape, which are vertically set in permanent underwater foundations 12, one girder being disposed at each corner of the surface 10 and also one at the center thereof, and the girders being connected together by means of braces 13.

The artificial surface 10 may conform generally with the slope of the underlying shore S, same sloping upwardly from the outer end thereof which receives the waves from the open sea in the direction of the arrows 14, shown in FIG. 1. Obviously, the angularity of the surface 10 may be changed to any angularity desired. In one useful embodiment the surface 10 might be substantially square in plan as shown in FIG. 2, and each side of the square may be in the neighborhood of 200 yards in length. The surface however might be substantially rectangular or even long and narrow. The upper surface of the member 10 may be covered with a smooth covering 10a as shown in FIG. 3, or the covering 10a may be corrugated as shown at 10b in FIG. 8 in which the humps and depressions have a general scale of 1–4 feet, the surface roughness having an important secondary influence on wave behavior.

Once a wave has begun to spill, thus losing energy, a very slight slope will maintain it in a form suitable for surfing, and thus, for a very substantial distance along the surface 10 the wave depth should be closely equal to the breaking depth. Typical slopes for creation of the spilling wave would range between $\frac{1}{10}$ and $\frac{1}{100}$, while slopes in the region beyond breaking would be less than $\frac{1}{100}$.

The basic object of constructing an artificial ocean bottom of suitable shape might be obtained in several other ways, e.g. (a) by dumping rock or other fill offshore to make the required surface; or (b) by sinking one or more large barges or other transportable structures modified or supported so that they rest at the proper angle. These barges might be floated away in the Fall of the year to protect them from storm damage. They might also be covered with a thin coating of fill to form the final surface.

One modification of the structure shown in FIGS. 1 and 2 should be the provision of a ramp 15 on the seaward side of the artificial surface 10 as shown in FIG. 4 to replace an otherwise vertical wave approach which might either trap or reflect considerable wave energy depending on whether it was open or covered over. The upper portion of the slope of ramp 15 might be adjusted by suitable means until the waves broke thereon in a spilling fashion. Then the overall level of the structure could be adjusted by suitable means until the break-point of the waves occurred at the upper edge of the ramp. The remaining slope would be just enough to maintain the wave properly. FIG. 4 illustrates such a ramp 15, the general construction of the wave-forming structure being similar to that illustrated in FIG. 1. However, at the seaward edge of the structure 10 a ramp 15 is provided which may be covered with a coating 15a similar to coating 10a, FIG. 3 or 10b of FIG. 8. The seaward end of the ramp 15 extends from the surface of the underlying shore S, as shown in FIG. 4, and the upper end thereof terminates at the seaward end of the surface 10, the ramp 15 thus preventing trapping or reflecting of sea-wave energy, and the sea-wave breaking in a spilling fashion upon the upper portion of the ramp 15, the break point of the waves occurring at the upper end of the ramp. The remaining slope of the ramp 15 is just enough to maintain the wave properly.

Possible elaborations on the basic concept of the artificial surface would include means, e.g., hydraulic, for raising or lowering the surface in order to accommodate the surface to changing tides and wave types, and to protect it in severe storms. FIG. 5 illustrates one means for raising or lowering the substantially rigid surface 10 to accommodate the surface to changing tides and wave types, and for protecting same in severe storms. In FIG. 5 the surface 10 is supported at its corners and at the center thereof by hydraulic rams 16 which are embedded in underwater foundations 17, whereby the entire surface 10 may be simultaneously raised or lowered. FIG. 5 shows the surface 10 in raised position in full lines for use during high tides, and also shows in dot-and-dash lines the surface 10 in lowered position for use during low tides, and for protecting the surface during severe storms.

The amount by which the surface could be raised or lowered might be different for different areas of the surface and the different areas might be connected together by flexible means so that the shape of the surface 10 could be altered from flat as shown in FIG. 5 to arcuate as shown in FIG. 9. In FIG. 9 the surface 10 is broken into relatively small areas 10x, each of which is supported on an hydraulic ram 16, as above described in connection with FIG. 5. The adjacent edges of the sections 10x of the surface 10 are connected together by flexible means 18 so that the amount by which each section 10x could be raised and lowered might vary in different areas 10x, as shown in FIG. 9, the areas 10x being connected by flexible means 18. By this construction the combined surface formed by the sections 10x could be varied from a flat surface, as shown in FIG. 5, to an arcuate or other surface as shown in FIG. 9.

If desired, the structure might also include means for rotating the surface so as to face most advantageously waves coming from different directions. One such means might include a central axis around which a circular surface might rotate, while the edges thereof rest on bearings or wheels on a suitable track.

Instead of utilizing a circular rotating surface, as above described, means may be provided for making the surface in the shape of a cone, or more generally any tapered cylinder, so as to accept waves from several directions without rotating the surface. Naturally, the cone could be truncated above the water's surface, and may be cut away in directions from which waves never come.

FIGS. 6 and 7 illustrate such structures. In FIG. 6 the surface 10 is flexible and supported upon hydraulic rams 18 disposed below the corners thereof and at the center thereof, the hydraulic rams 18 being mounted in underwater foundations 19. As shown in FIG. 6 the ram at the center of the surface 10 is extended so as to give the surface 10 a cone-shape to accept waves coming from several directions without requiring rotating the surface. In FIG. 6 the apex of the cone is shown truncated above the water surface and the surface may be cut away in directions from which waves never come. In FIG. 7 the central hydraulic ram 18 is shown retracted and the corner rams 18 extended, thus reversing the cone effect, thereby providing a surface in which the seaward side thereof is trough-like in form as it leads to the surfing area, so as to concentrate the wave energy by refraction and thereby obtain or form larger waves.

The surface might be long and narrow, not quite parallel to the wave crest so that the wave will intersect the surface 10 at a slight angle, and at the intersection the wave would be suitable for surfing, but the surfer would get a long ride.

In each modification the surface 10 could be covered with some soft substance to protect users from injury. The surface 10 might extend above water to provide a resting place for users. The near-water level portions of the surface might be made porous to reduce wave backwash which might interfere with following waves. The surface 10 might be smooth, or rough to the extent of bumps and depressions with a general scale of 1–4 feet. The surface roughness is an important secondary influence on wave behavior.

I claim:

1. An artificial sea-bottom structure for surfers and swimmers disposed off-shore to form waves thereon of desired type from arriving deep-ocean waves, comprising an impervious surface of relatively large area disposed above the true sea-bottom; and means in said true sea-bottom for supporting the said surface; the slope of said surface with respect to sea-level being downwardly toward the sea and of magnitude ranging between $\frac{1}{10}$ and $\frac{1}{100}$ in the region of creation of the wave; and the depth of the surface at breaking lying between 0.7 and 3.0 times the deep water crest-to-trough height depending on wave steepness.

2. In a structure as set forth in claim 1, said surface being rigid and rectangular, and said means comprising vertical girders disposed below the said surface for supporting same with a downward slope towards the sea.

3. In a structure as set forth in claim 1, an impervious ramp extending from the seaward edge of the surface downwardly and seawardly to meet the true sea-bottom.

4. In a structure as set forth in claim 1, means for raising and lowering the surface to accommodate changing tides.

5. In a structure as set forth in claim 4, said surface being rigid; and said raising and lowering means comprising elevating means disposed below the center and periphery of said surface whereby all parts of the surface may be adjusted while maintaining its downward slope towards the sea.

6. In a structure as set forth in claim 1, means whereby the entire surface may be altered from flat to curved.

7. In a structure as set forth in claim 6, said surface being divided into rows of relatively small rigid areas; and said altering means comprising individual elevating means disposed below each section; and flexible means connecting together the adjacent edges of adjacent sections.

8. In a structure as set forth in claim 1, said surface being flexible and said means comprising separate elevating means disposed below the center and periphery of the surface respectively, whereby when the center elevating means is extended the surface will be cone-shaped, and when the center elevating means is retracted the surface will be of reversed cone-shape to provide a trough to the surface at the seaward side thereof.

9. In a structure as set forth in claim 1, a covering on said surface having a roughness to influence the wave behavior.

10. In a structure as set forth in claim 1, the near water-level portions of the surface being porous to reduce backwash.

References Cited

UNITED STATES PATENTS

| | | | |
|---|---|---|---|
| 2,584,867 | 2/1952 | Guarin | 61—5 |
| 2,920,454 | 1/1960 | Wolf | 61—4 |
| 3,191,386 | 6/1965 | Wiegel et al. | 61—5 |
| 3,197,963 | 8/1965 | Frederiksen | 61—5 |

JACOB SHAPIRO, Primary Examiner

U.S. Cl. X.R.

61—5